March 23, 1954
C. E. JOHNSON
2,672,988
FOLDING TRAY
Filed April 3, 1951
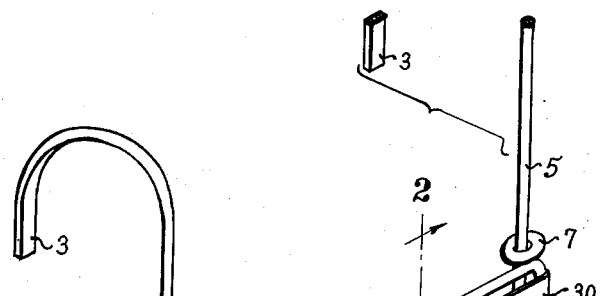
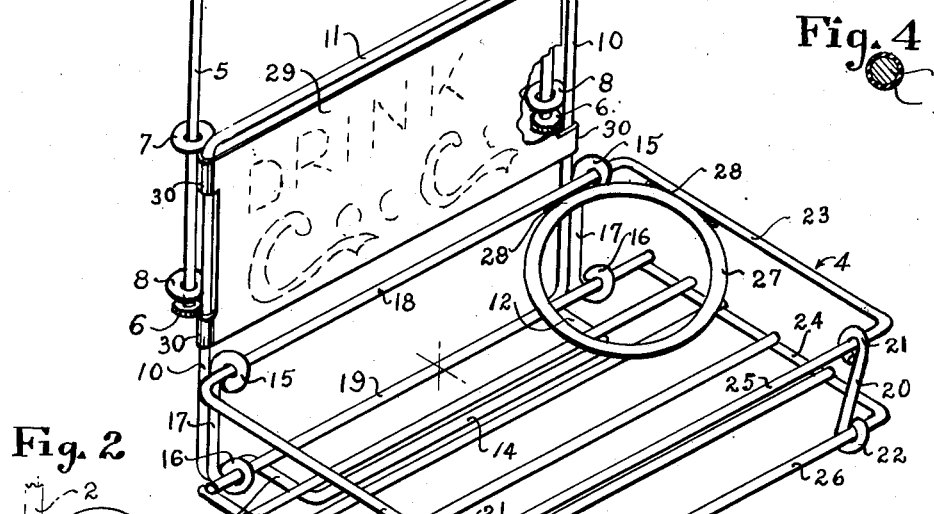
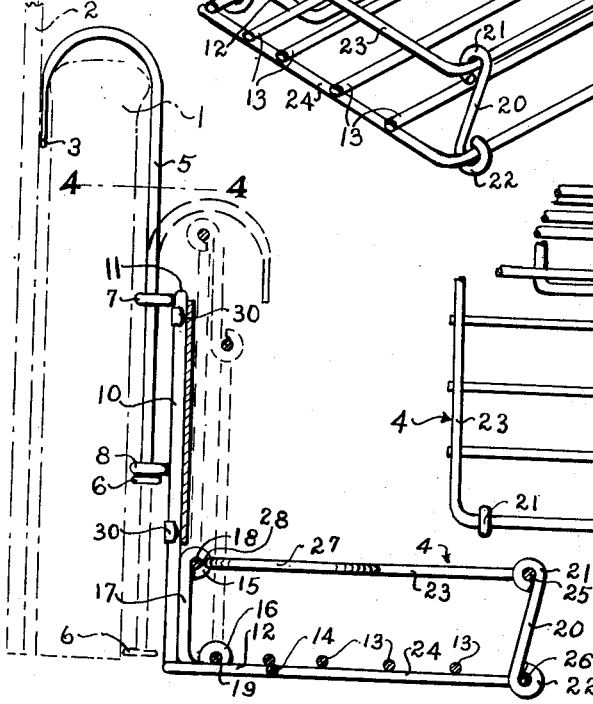
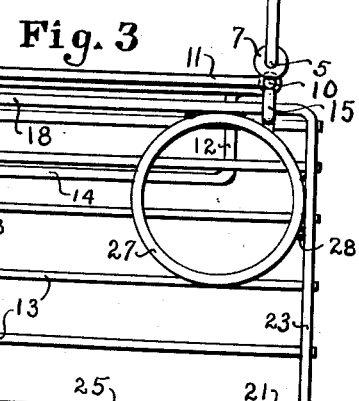
INVENTOR.
Clyde E. Johnson
BY
Wayland D. Keith
HIS AGENT.

Patented Mar. 23, 1954

2,672,988

UNITED STATES PATENT OFFICE 2,672,988

FOLDING TRAY

Clyde E. Johnson, Wichita Falls, Tex.

Application April 3, 1951, Serial No. 219,005

4 Claims. (Cl. 211—88)

This invention relates to improvements in folding trays and more particularly to folding trays for attachment to automobiles and the like, either on the interior or exterior thereof, for serving sandwiches, beverages and other refeshments to the occupants of the car.

Various serving trays for automobiles have been proposed heretofore, but these, for the most part have been complicated in design and expensive to manufacture, which has precluded the individual car owner from having a number of individual serving trays in his car, so that each occupant of the car may have one at his disposal.

The present service trays now in general use are of such construction as to necessitate the lowering of the car window for attachment of the tray thereto, and with the tray attached to the exterior of the car, the window had to remain open while the tray was in use. This situation is highly undesirable in cold or inclement weather, and provided a business handicap for owners of concessions, cafes and the like who cater to "drive-in trade."

The present tray may be constructed of material such as wire, part wire and part sheet metal, or various combinations of wire and wood, wire and plastic and the like can be utilized. The principal advantage of this tray is that it is so constructed as to fit on either the interior or the exterior of a car, and it may be made sufficiently small so as to serve as an individual tray and one may be provided for each occupant of the car, or it may be large enough to serve all the occupants of the car. In whatever size the tray is made it may be folded into a very compact space, and from four to six of the individual size may be folded and packed into the glove compartment of the car.

An object of this invention is to provide a serving for automobiles that may be used either on the interior or exterior of the car and which, when not in use, may be folded into a comparatively small flat parcel which may be stored in a minimum of space.

Another object of the invention is to provide a serving tray that is comparatively open in construction, that is easily cleaned but is sufficiently sturdy to withstand hard usage.

Still another object of this invention is to provide a serving tray which will hold beverage containers against misplacement while the car is in motion, or against accidental tipping thereof while the car is not in motion, thereby preserving the interior of the car in clean condition and the upholstery unstained.

Yet another object of this invention is to provide a serving tray that is so constructed as to provide advertising space or menu display space on a portion thereof.

With these and other objects that will manifest themselves as the description proceeds, in mind, reference is to be had to the accompanying drawings, in which:

Fig. 1 is a perspective view of the invention with the tray in position for attachment to a vehicle or the like, with parts broken away and shown in section to bring out the details of construction;

Fig. 2 is a sectional view of the invention shown in full lines, taken on the line 2—2 of Fig. 1 and with the tray shown attached to the vehicle; the dashed outline portion of the figure shows the invention in folded position; and Fig. 3 is a top plan view of the invention with parts broken away and shown in section to illustrate the details of construction; and Fig. 4 is a cross section taken on the line 4—4 of Fig. 2 showing an enlarged sectional view through one of the members showing a plastic coating thereon, which is representative of the other members.

With more detailed reference to the drawing, the numeral 1 designates a portion of a car body, which portion may be either exterior or interior of the car, with the glass 2, which may be either a window or door of the car, in adjacent relation to the portion 1. The usual car construction provides sufficient clearance between the body 1 of the car and the glass 2, so a support member having flattened hook portion 3, of the tray which is generally designated at 4, may be positioned within this space. The hook portion 3 extends downward to form a stem 5 which has an enlarged head 6 on the lower end thereof. A pair of eyelets 7 and 8 are secured to the upright frame 10 at each end thereof and receive the stem 5 therein, in sliding relation thereto. A crossbar 11 may be secured to or formed integral with upright pieces 10, so as to form a rigid construction. The lower ends of the upright frame 10 have in-turned portions 12 that form a bracket to support the bottom portion 13 of the tray 4, when the tray is in extended position. A tie-bar 14 preferably extends between and is formed integral with said in-turned portions 12 so as to form a rigid frame. A pair of bars 17, each having a loop 15 and 16 at the respective opposite ends, and each of the bars 17 is secured to the lower portion of upright members 10, as by welding or soldering or the like, so that the loops 15 and 16 on the respective bars 17 will be spaced apart and aligned to receive rods 18 and 19 therethrough, as will best be seen in Figs. 1 and 2. Spaced laterally outward from bar 17 is a pair of bars 20, each of which bars 20 has loops 21 and 22 on the respective opposite ends, which loops are of substantially the same spacing as loops 15 and 16. Rods 18 and 19 may be bent to form the respective ends 23 and 24. The outer portions 25 and 26 of the respective bars 18 and 19 pass through the respective loops 21 and 22, and are substantially parallel to bars 18 and 19. The bottom 13 preferably has a series of rods extending between end members 24 and are secured thereto to support beverage containers, and other refreshments when the tray is in outstanding position, as indicated in Figs. 1 and 2. The bars 13, which form the bottom of the tray, may be welded or soldered to bars 24 in a manner well understood in the art of constructing similar articles.

A ring 27 may be located adjacent a corner of the tray and welded or soldered at 28 to the two adjacent rods, as indicated in Figs. 1 and 3. This ring will preclude the dislocation of beverage containers and the like, either while the vehicle is in motion or is standing still.

A sheet metal portion 29 may be interposed between the upright members 10 and secured thereto by means of hooks 30, which sheet metal portion forms bracing means and may provide for advertising space, for menus and the like.

As pointed out, the device may be used either on the interior or exterior of the car and may be made of any desired size and with one or more rings as desired, which rings are secured to bars 18, 23 and 25. When not in use, the outwardly extending portion of the tray 4 may be moved upward to a position as indicated in the dashed outline in Fig. 2, and the hook portion 3 reversed, and the stem portion 5 telescoped until the hook overlies the folded tray portion. The hooks may be further pivoted within rings 7 and 8 so as to flatten against folded tray 4 so the tray will be packed in a minimum amount of space.

It is to be pointed out that, with bars 17 having loops 15 and 16 at the ends thereof, and bars 20 with the loops 21 and 22 at each end thereof are substantially the same distance apart as the loops 15 and 16, so the serving tray will fold with all bars in parallel relation.

It is to be further pointed out that the loop 16 is off-set outward approximately the thickness of the wire so that the wires will not interfere or bend when the tray is folded. This is true also with respect to loops 21 and 22, as will best be seen in Fig. 2, in dashed outline.

A tray of this nature may be readily sterilized and cleansed by immersion, and because of its construction, will require no drying, as there are no pockets or reservoirs to catch and retain liquids.

The various unassembled parts may be coated with a resinous plastic or rubber-like material R, as shown in Fig. 4, so that the hooks and associated parts will not mar the finish of the car at the points of contact therewith. This covering or coating will also prevent rust or corrosion of the various parts and will prevent marring of counters or other surfaces on which the trays are stacked when not in use. The rubber-like or resinous coating will also deaden noise while the trays are being used or are being transported.

While the invention has been illustrated and described in some detail in one embodiment thereof, it is to be understood that changes may be made in the minor details of construction and adaptions made to particular installations, without departing from the spirit of the invention as set forth in the appended claims.

Having thus clearly shown and described the invention what is claimed as new and desired to secure by Letters Patent is:

1. In a folding, wire serving tray, a pair of upright wire members each having a pair of aligned looped elements, a stem having a head on the lower end and a flattened hook on the upper end slidably fitted in each pair of aligned loop elements, said upright wire members having an outturned portion at the lower ends thereof forming a support, a wire bottom member hingeably attached to said upright wire members above said support for upward swinging movement and in position to rest upon said support when in a substantially horizontal position, a wire rail surrounding said bottom and spaced thereabove and hingeably connected thereto and to said upright wire members and swingable with said bottom so as to fold into a substantially flat position.

2. In a folding serving tray for attachment to a vehicle, a pair of upright members each having a pair of axially aligned loops attached thereto, the axes of which pairs of loops are substantially parallel to each other and in a substantially vertical plane when in serving position, a pair of support members each having a stop member on the lower end thereof, each of said support members positioned within a pair of said axially aligned loops for relative rotatable and sliding movement with respect to said upright members, a down-turned hook on the upper end of each of said support members adapted to engage within a constricted place in said vehicle, an outwardly extending tray member hingeably secured to the lower ends of said upright members, hinge means on the upright members and tray member, and extending upwardly and each terminating in a loop which forms a second hinge joint, a rail surrounding the periphery of said outwardly extending tray and positioned within said second loops, said tray portion and said rail being adapted to fold into substantially flat relation with respect to said upright members when the tray is folded, and said support members being adapted to telescope with respect to said upright members, the hooks of which are adapted to occupy a position substantially parallel with said tray portion, further means attached to said rail for retaining a beverage container against lateral movement.

3. A collapsible tray for use on a vehicle, which tray comprises a pair of upright frame members each having a hook member telescopically attached to a side thereof, said hooks forming means for attaching said tray to said vehicle, a bottom portion hingeably attached to said upright frame members, a horizontal tie bar secured to said upright frame members for supporting said bottom portion in rigid, outstanding relation to said upright frame members when said bottom is in open position, a retaining rail surrounding the outer periphery of said bottom portion and spaced thereabove and hingeably secured thereto and to the upright frame members, and a coating of resilient material on said tray parts so as to deaden noise and to protect the finish of said vehicle at points of contact.

4. A collapsible tray for use on a vehicle, which tray comprises a pair of upright frame members each having a hook member telescopically attached to a side thereof, said hooks forming means for attaching said tray to said vehicle, a bottom portion hingeably attached to said upright frame members, a horizontal tie bar secured to said upright frame members for supporting said bottom portion in rigid, outstanding relation to said upright frame members when said bottom portion is in open position, a retaining rail surrounding the outer periphery of said bottom portion and spaced thereabove and hingeably secured thereto and to the upright frame members, and a plastic material coating certain of said tray parts to deaden the noise and to protect the finish of said vehicle at points of contact.

CLYDE E. JOHNSON.

References Cited in the file of this patent

UNITED STATES PATENTS

| Number | Name | Date |
|---|---|---|
| 1,223,272 | Gurley | Apr. 17, 1917 |
| 1,383,324 | Martell | July 5, 1921 |
| 1,476,034 | Banks | Dec. 4, 1923 |
| 1,546,768 | West | July 21, 1925 |
| 1,630,889 | Clarke | May 31, 1927 |
| 1,631,725 | Halvorsen | June 7, 1927 |
| 1,925,523 | Cuff et al. | Sept. 5, 1933 |
| 2,101,686 | Offutt | Dec. 7, 1937 |
| 2,315,001 | Logan | Mar. 30, 1943 |
| 2,333,954 | Rocker et al. | Nov. 9, 1943 |